March 15, 1966 C. E. BURGI ETAL 3,240,997
POWER SUPPLY
Filed Oct. 2, 1962 2 Sheets-Sheet 1

INVENTORS
CHARLES E. BURGI
BY JEE G. WONG

*Sidney Magnes*

AGENT

INVENTORS
CHARLES E. BURGI
JEE G. WONG
BY
*Sidney Magnes*
AGENT

United States Patent Office 3,240,997
Patented Mar. 15, 1966

3,240,997
POWER SUPPLY
Charles E. Burgi, Long Beach, and Jee G. Wong, Montebello, Calif., assignors to North American Aviation, Inc.
Filed Oct. 2, 1962, Ser. No. 227,933
3 Claims. (Cl. 317—33)

This invention relates to a power supply; and more particularly to a regulated power supply that is protected against external short-circuits, and against extreme reductions of the resistance of its load.

Background

Most electronic circuitry, and some electrical equipment, require that the voltage supplied to it be kept within predetermined upper and lower limits. A circuit that provides a voltage maintained within these limits under conditions ranging from no load to full load or even in excess of full load, is known as a "regulated" power supply.

It is an undesirable characteristic of these regulated power supplies that they are generally incapable of protecting themselves against an external short circuit, or an extreme reduction of the resistance of load. These conditions cause such a large flow of electrical current that the power supply or its regulating circuit or both may be destroyed in an attempt to correct the situation, or by the heat produced by the excessively large current.

Objects and drawings

It is therefore the principal object of our invention to provide an improved power supply.

It is a further object of this invention to provide a power supply which will protect against short circuits.

The attainment of this object and others will be realized from the following specification, taken in conjunction with the drawings of which:

Synopsis

Broadly speaking, our invention contemplates protective circuitry that senses when a short-circuit occurs, and disables the power supply circuitry for the duration of the short-circuit condition. Moreover, our inventive concept includes a circuit for inactivating the disabling protective circuitry under predetermined conditions.

Description of invention

Figure 1:
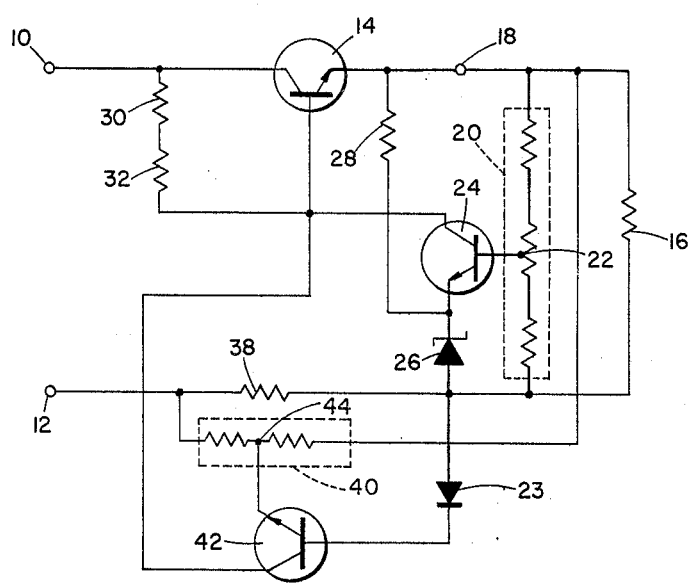
FIG. 1 is a schematic diagram which illustrates our basic inventive concept.

Our invention will be understood from a study of FIG. 1. This shows circuitry, such as a regulated power supply whose output voltage is to be maintained within predetermined limits, and includes disabling circuitry that protects the power supply and its regulating circuitry against the danger of burning out when a short circuit occurs.

In operation, electricity from an input terminal 10 of an undisclosed source flows through a regulating element 14 and a load 16, and then returns to the other terminal 12 of the source. Assume for the moment that the voltage of the source, and therefore the voltage at output terminal 18 of the power supply, increases slightly. A regulating voltage-divider 20, connected across the output of the power supply, causes a tap-point 22 to pick off a sample of the increased voltage; and this "sample" voltage is applied to the base-electrode of a normally-conductive control-element 24, which may be a transistor operating as a class A amplifier.

A zener diode 26 is connected to the emitter-electrode of control-transistor 24 to provide a fixed-value "reference" voltage; and a "keep-alive" resistance 28 assures that the zener diode 26 remains operative. The relation between the increased sample voltage from tap-point 22, and the fixed-value reference voltage from zener diode 26 causes the control-element 24 to become more conductive; and suitable circuitry, such as resistors 30 and 32, causes the regulating-element 14 to become less conductive. Its increased resistance decreases the voltage available at output terminal 18, in this way counteracting the increase of voltage that initiated the regulating action.

In a somewhat similar manner, any slight decrease of voltage at input terminal 10, and therefore at output terminal 18, has the effect of causing the regulating-element 14 to become somewhat more conductive; which thus increases the voltage at output terminal 18 to compensate for the decrease of voltage that initiated this regulating action.

In this way the disclosed circuit produces a regulating action that maintains the voltage at output terminal 18 within predetermined limits.

Protective circuitry operation

Our protective circuit becomes operative under the following conditions. If a short-circuit occurs, an excessively large current flows through the circuit, and causes the voltage at output terminal 18 to drop to a lower-than-normal value. The same result occurs if load 16 itself becomes short-circuited. A similar result occurs if conditions within load 16 change in such a way as to reduce the magnitude of its impedance, and thus cause it to draw an excessive current.

Under any of the above conditions, the excessive current passes through series-resistance 38; and the reduced voltage at output terminal 18 is impressed across a protective voltage-divider 40.

Our protective circuit comprises a normally non-conductive disabling-element 42, which may be a transistor having its emitter-electrode connected to a sampling point 44 of protective voltage-divider 40, and having its base-electrode connected through a coupling-diode 23 to the end of series-resistance 38.

The increased current through series-resistance 38 causes an increased voltage-drop across series-resistance 38; and this increased voltage is transmitted in the form of an energizing signal through coupling diode 23 to raise the potential at the base-electrode of disabling-transistor 42.

Simultaneously the decrease of voltage across protective voltage-divider 40 is sensed at sampling point 44; and is applied in the form of a second energizing signal to the emitter-electrode of disabling transistor 42. The combined effect of the two energizing signals applied to the electrodes of transistor 42 causes transistor 42 to become conductive; whereupon it produces a disabling signal that co-acts with resistors 30 and 32 to reduce the conductivity of regulating-transistor 14 to practically the cut-off point.

This cutting-off action of regulating transistor 14 has the effect of substantially breaking the circuit to output terminal 18; and thus prevents damage due to the flow of the excessively large current caused by the reduced load or the short circuit condition.

In this way, our protective circuit disables the power supply, and assures that the power supply and its regulating circuit are protected from unduly large currents.

The disclosed disabling circuitry resets itself as soon as the short circuit or the malfunction is corrected. As soon as the correction is made, the excessively large current ceases to flow through series-resistance 38, and eliminates the energizing signal therefrom. This permits the voltage at the base-electrode of transistor 42 to decrease.

Simultaneously, the voltage at sample point 44 increases, thus eliminating the energizing signal applied to the emitter-electrode of transistor 42. These combined actions cause disabling-transistor 42 to return to its normal non-conductive state; permits regulating element 14 to become conductive; and thus permits the power supply and its regulating circuit to resume their normal operation.

We have found that once the disabling-transistor 42 becomes conductive, it modifies the operation of regulating element 14 so that, instead of an excessively large current, only a very small current flows through series-resistance 38. Under the modified operation, this small current maintains transistor 42 in its conductive state, and thus maintains the protective state of the circuitry.

*Dual power supply circuitry*

Figure 2:
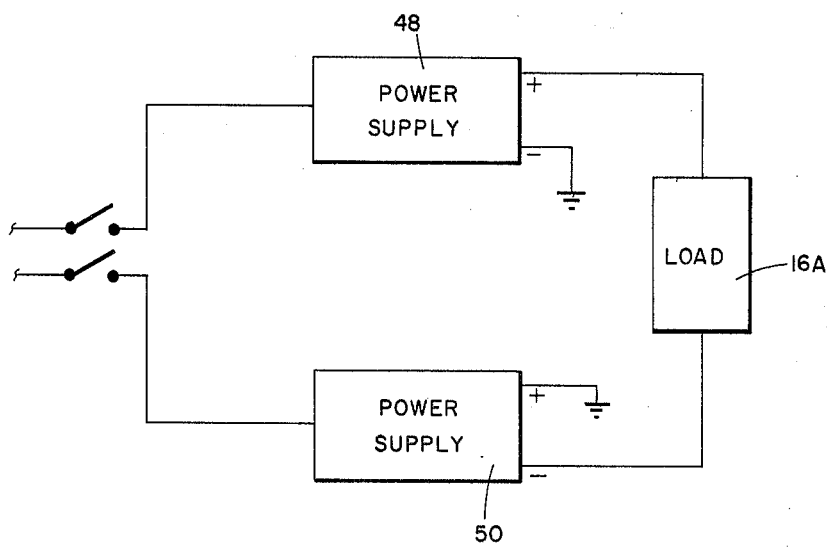
FIG. 2 shows in block-diagram form the use of two power supplies.

Under some conditions it is desirable that a load be operated from two oppositely-poled power supplies; and examplar circuitry of this dual-power-supply operation is shown in FIG. 2. Here load 16A has one terminal connected to a first power supply 48, and has its other terminal connected to a second power supply 50.

Since no two power supplies such as 48 and 50 become completely operative at the same instant when power is supplied to them, the electricity from the operative power supply (say 48) traverses the load 16A, and tries to flow through the inoperative power supply 50.

This condition is particularly undesirable, because the current flow through the inoperative power supply is through series-resistance 38 of FIG. 1. The current flowing through the series-resistance tends to make disabling transistor 42 conductive—which in turn tends to make regulating transistor 14 non-conductive; thus maintaining the inoperative power supply 48 in its inoperative state. This condition is just the opposite of the desired condition wherein both power supplies are operative.

Figure 3:
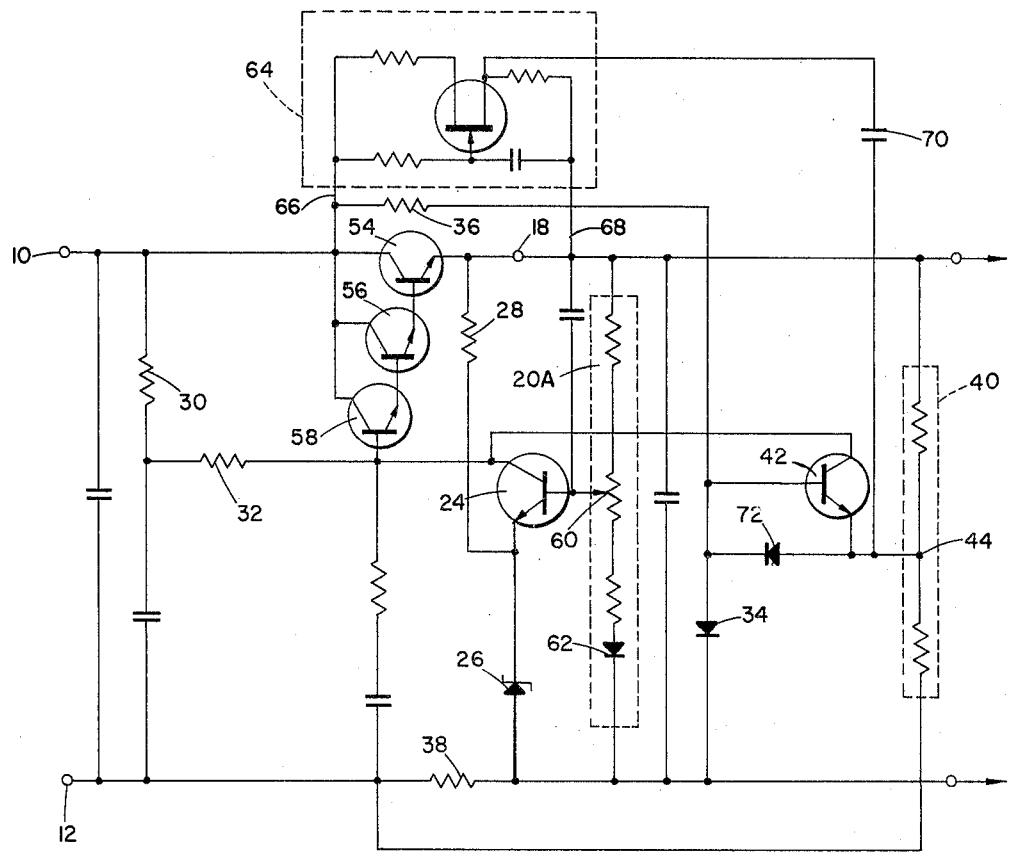
FIG. 3 shows an embodiment of our invention that may be used for the purpose shown in FIG. 2.

The embodiment of our invention shown in FIG. 3 overcomes the above shortcomings.

The circuitry of FIG. 3 is substantially the same as that of FIG. 1, except that a number of capacitors have been added to bypass A.-C. signals to ground; and three cascaded transistors 54, 56, and 58 have been substituted for the single regulating-transistor 14 in order to provide a more-sensitive regulating action.

In addition, voltage divider 20A has been modified so that the sample voltage is selectable by means of a potentiometer 60; and a diode 62 has been added to provide temperature stability.

Moreover, a reference-voltage-producing diode 34 and a keep-alive resistance 36 have been added to the disabling circuit to provide improved performance.

It was previously pointed out that a low voltage at output terminal 18 and/or a current through series resistor 38 causes the disabling transistor 42 to become conductive, and to thus disable the power supply.

If, however, the power supply is energized, but inoperative, the fact that the disabling transistor 42 becomes conductive causes the power supply to remain disabled; a condition which is undesirable since it is desired that this power supply become operative as soon as possible.

*Inactivation of the protective circuitry*

In order to prevent the disabling action of transistor 42, we use a blocking oscillator 64. It will be noted that one lead wire 66 of the blocking oscillator 64 is connected to the input terminal 10, and that the other lead wire 68 of the blocking oscillator is connected to the output terminal 18. A study of the circuit of FIG. 3 will show that voltage dividers 20A and 40 provide a connection between the second lead wire 68 and the return wire to the input terminal 12; in this way providing a complete circuit for the operation of blocking oscillator 64. The blocking oscillator is therefore properly energized, and becomes operative; despite the fact that the power supply itself is inoperative.

Blocking oscillator 64 produces a series of positive pulses that are applied through coupling capacitor 70 to the emitter-electrode of disabling-transistor 42; thus preventing disabling-transistor 42 from becoming conductive and disabling the power supply. Since the positive pulses from the blocking oscillator may have a relatively high magnitude, a protecting diode 72 is connected between the emitter and the base-electrodes of transistor 42; in this way assuring that only the desired magnitude of signal will be applied across these electrodes.

Thus, even though the load current from the operative power supply (48 of FIGURE 2) is passing through series-resistance 38, the disabling-transistor 42 is prevented from becoming conductive by the operation of blocking oscillator 64. Thus, the action of the blocking oscillator inactivates the disabling circuitry, and permits the power supply to become operative, and to co-act in the circuit of FIG. 2.

Once the power supply becomes operative, the lead wire 66 and 68 of blocking oscillator 64 are at substantially the same voltage. This condition de-energizes the blocking oscillator; and permits the disabling transistor 42 to operate in its normal protective manner.

*Advantages*

It may now be understood that our invention has innumerable advantages over the prior-art circuitry. Firstly, it protects circuits such as regulated power supplies from damages that may occur under short-circuit conditions. Secondly, both short-circuit effects, i.e., high-current and low-voltage, are used to provide immediate protection. Thirdly, the protective circuit drops out as soon as the short-circuit is corrected. Fourthly when the power supplies are used in a dual-power-supply configuration, a blocking oscillator assures that both power supplies become operative as soon as possible. And finally, our circuit may use any siutable type of transistor or electron tube; and may be adapted to use relays.

Although the invention has been described and illustrated in detail, it is to be clearly understood that the same is by way of illustration and example only and is not to be taken by away of limitation; the spirit and scope of this invention being limited only by the terms of the appended claims.

We claim:
1. For use with a power supply having a load and a regulating element, protective circuit comprising
   a series-resistance in series with said power supply and load for sensing excessively large currents, and producing a first energizing signal;
   a voltage-divider shunt connected across the output of said power supply and in parallel circuit with said series-interconnected series resistance and load supply for sensing a lower-than-normal power supply voltage, and producing a second energizing signal;
   a protective circuit, comprising an electron-discharge device;
   means for applying said energizing signals to selected control electrodes of said electron-discharge device; and means for connecting a selected output electrode of said electron-discharge device to a control input of said regulating element for causing said regulating element to become appreciably less conductive during the interval when either one of said energizing signals is applied to a corresponding one of said selected electrodes of said electron-discharge device, whereby the circuit to said load of said power supply is substantially broken.

2. A protective circuit for a power supply having a regulating element, comprising in combination
 a source of energy having two terminals;
 a series resistance in said power supply, for sensing excessive currents, and producing a first energizing signal;
 a voltage-divider connected across the output of said power supply, for sensing lower-than-normal voltage, and producing a second energizing signal;
 a disabling transistor;
 means for applying said first and second energizing signals to selected electrodes of said transistor to cause said transistor to become conductive;
 a blocking oscillator having two lead wires;
 means for causing said blocking oscillator to become operative when said power supply is energized but inoperative, said means comprising a connection between one of said lead wires and one terminal of said source, and means for connecting said other lead wire to the other terminal of said source; and
 means for applying the output of said operative blocking oscillator to a selected electrode of said disabling transistor to maintain said disabling transistor in a non-conductive state.

3. The combination comprising
 a dual supply circuit, each power supply having a protective circuit including
 first means, comprising a series-resistance in said power supply, for sensing excessive currents, and producing a first energizing signal;
 second means, comprising a voltage-divider connected across the regulated output of said power supply, for sensing lower-than-normal voltage, and producing a second energizing signal;
 a disabling transistor having a plurality of electrodes, the base electrode of which is coupled to said series-resistance, and a selected one of the emitter and collector electrodes of which is connected to said voltage-divider, whereby
 said first and second energizing signals cause said disabling transistor to become conductive under conditions of excessive current and lower-than-normal voltage;
 a blocking oscillator;
 means for causing said blocking oscillator to become operative when said power supply is energized but inoperative; and
 means for applying the output of said operative blocking oscillator to a selected electrode of said disabling transistor to maintain said disabling transistor in a non-conductive state.

References Cited by the Examiner

UNITED STATES PATENTS 3,096,475    7/1963    Brooks _____ 317—33 XR
3,122,697    2/1964    Kauders _____ 317—33 XR SAMUEL BERNSTEIN, *Primary Examiner.*